United States Patent
Rydén et al.

(10) Patent No.: US 10,104,587 B2
(45) Date of Patent: Oct. 16, 2018

(54) FIRST NETWORK NODE, A SECOND NETWORK NODE, AND METHODS THEREIN FOR HANDOVER

(71) Applicant: Telefonaktiebolaget LM Ericsson (publ), Stockholm (SE)

(72) Inventors: Henrik Rydén, Linköping (SE); Mirsad Cirkic, Linköping (SE); Pradeepa Ramachandra, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 81 days.

(21) Appl. No.: 15/329,271

(22) PCT Filed: Dec. 6, 2016

(86) PCT No.: PCT/SE2016/051224
§ 371 (c)(1),
(2) Date: Jan. 26, 2017

(87) PCT Pub. No.: WO2018/106161
PCT Pub. Date: Jun. 14, 2018

(65) Prior Publication Data
US 2018/0213455 A1    Jul. 26, 2018

(51) Int. Cl.
*H04W 24/10*    (2009.01)
*H04W 36/00*    (2009.01)
(Continued)

(52) U.S. Cl.
CPC ........... *H04W 36/08* (2013.01); *H04W 24/10* (2013.01); *H04W 36/0072* (2013.01);
(Continued)

(58) Field of Classification Search
CPC .............................. H04W 24/02–24/10; H04W 36/0005–36/385;
(Continued)

(56) References Cited

FOREIGN PATENT DOCUMENTS

| EP | 1860904 A1 | 11/2007 |
|---|---|---|
| WO | 2014019739 A1 | 2/2014 |

OTHER PUBLICATIONS

Huawei, et al., "Design Principles for Mobility in NR", 3GPP TSG-RAN WG2 Meeting #95, R2-165436, Huawei, HiSilicon, Gothenburg, Sweden, Aug. 22-26, 2016, pp. 1-4.
(Continued)

*Primary Examiner* — Timothy J Weidner
(74) *Attorney, Agent, or Firm* — Murphy, Bilak & Homiller, PLLC

(57) ABSTRACT

A first Network Node (NN) 206 and a method therein for enabling handover of a first and a second wireless device 210,212 from the first NN to a second NN 208. The first NN determines that the second wireless device is to refrain from transmitting an uplink synchronization signal. Based on the determination, the first NN configures the first wireless device to transmit an uplink synchronization signal and to synchronize to a first downlink synchronization signal, an configures the second wireless device to synchronize to a second downlink synchronization signal. The first NN receives, from the second NN, information relating to a measurement performed on the uplink synchronization signal transmitted only from the first wireless device. Based on the received information, the first NN requests the second NN to perform the handover of the first and second wireless devices.

34 Claims, 8 Drawing Sheets

(51) Int. Cl.
*H04W 36/08* (2009.01)
*H04W 36/30* (2009.01)
*H04W 36/38* (2009.01)
*H04W 56/00* (2009.01)
*H04W 88/06* (2009.01)
*H04W 88/08* (2009.01)
*H04W 92/10* (2009.01)
*H04W 92/20* (2009.01)

(52) U.S. Cl.
CPC ....... *H04W 36/0094* (2013.01); *H04W 36/30* (2013.01); *H04W 36/38* (2013.01); *H04W 56/0015* (2013.01); *H04W 88/06* (2013.01); *H04W 88/08* (2013.01); *H04W 92/10* (2013.01); *H04W 92/20* (2013.01)

(58) Field of Classification Search
CPC ..................... H04W 56/0005–56/0095; H04W 88/06–88/12; H04W 92/02; H04W 92/04; H04W 92/10; H04W 92/12; H04W 92/16; H04W 92/20; H04W 92/22
See application file for complete search history.

(56) References Cited

OTHER PUBLICATIONS

Unknown, Author, "UI measurement based intra-node mobility in RRC_Connected", 3GPP TSG-RAN WG2 Meeting #96, R2-168721, Ericsson, Reno, Nevada, USA, Nov. 14-18, 2016, pp. 1-2.

Fig. 4 Method performed by the first Network Node (NN) 206

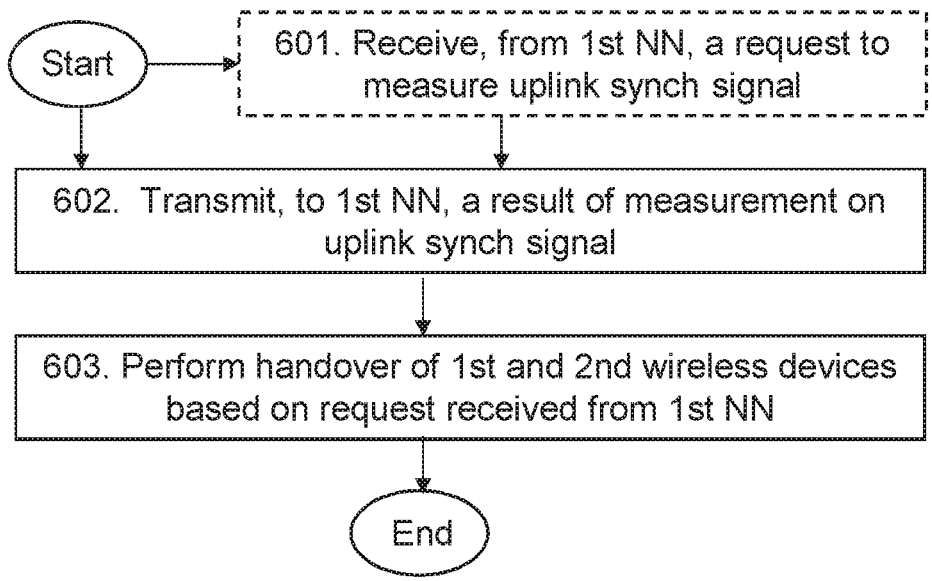
Fig. 6 Method performed by
the second Network Node (NN) 208
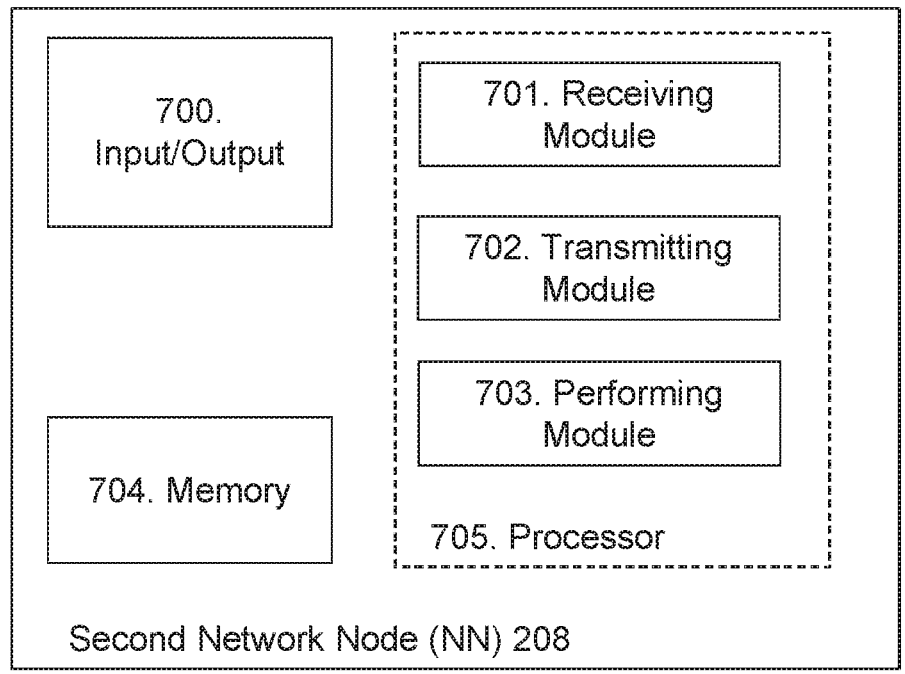
Fig. 7

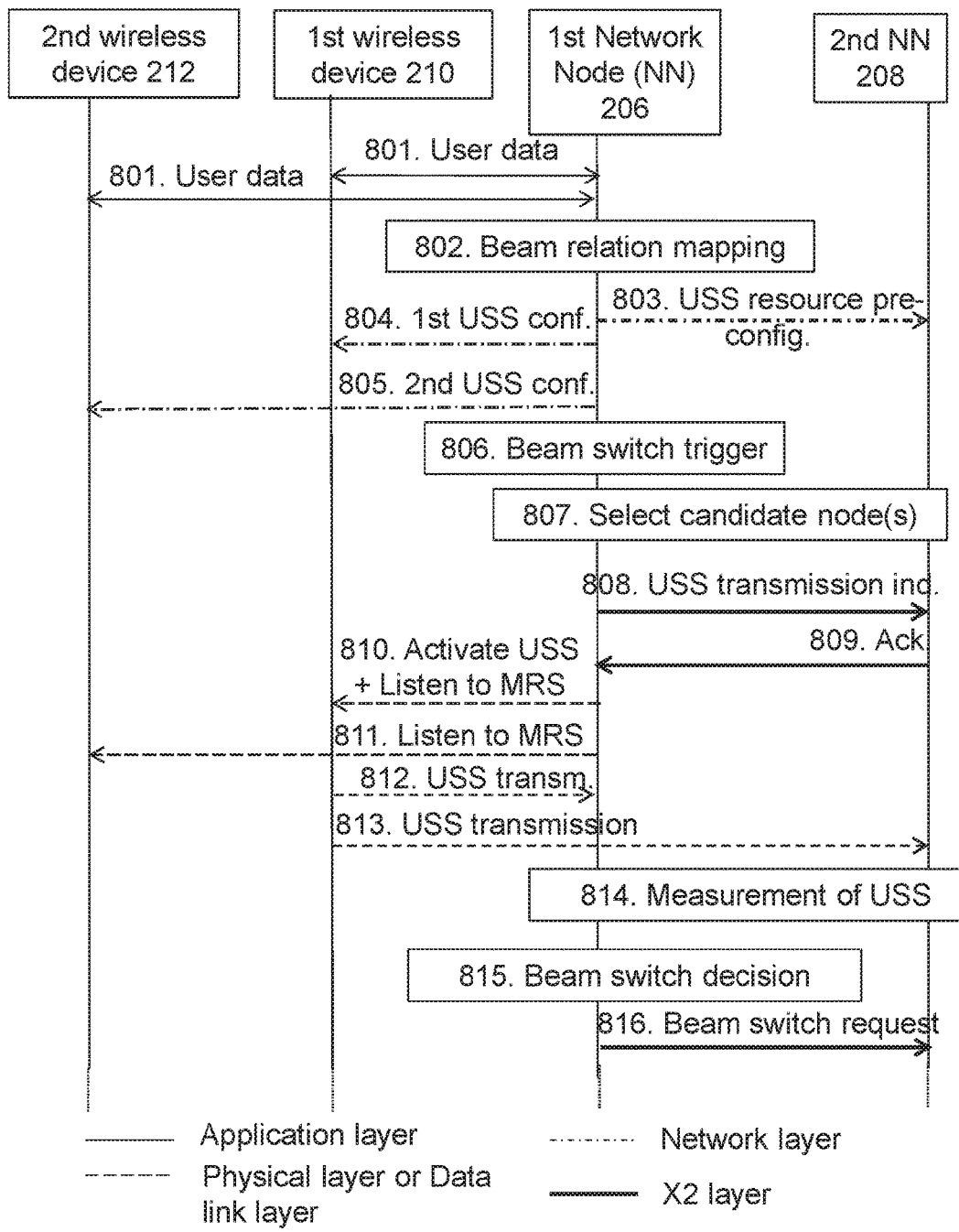
Fig. 8, to be continued

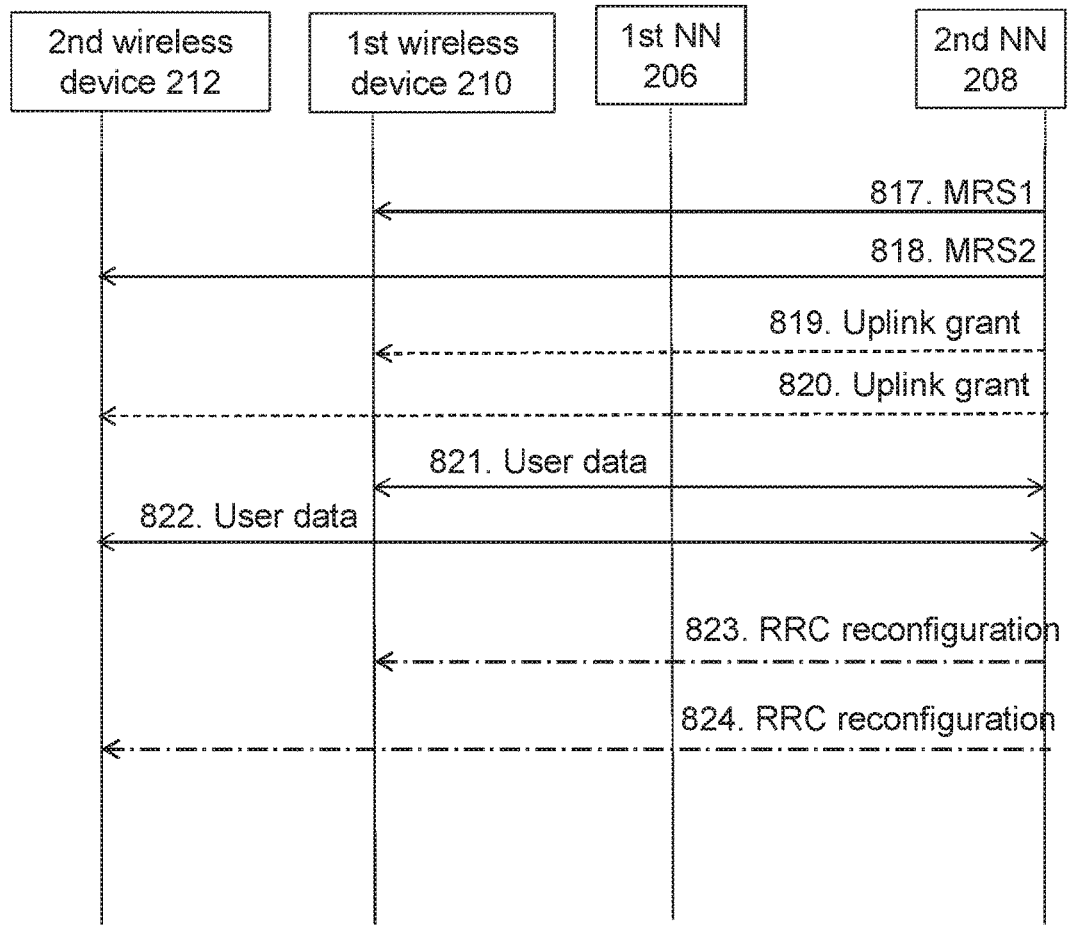
Fig. 8, continued

FIRST NETWORK NODE, A SECOND NETWORK NODE, AND METHODS THEREIN FOR HANDOVER

TECHNICAL FIELD

Embodiments herein relate generally to a first network node, a second network node, and to methods therein. In particular they relate to handover of a first wireless device and a second wireless device from the first network node to the second network node.

BACKGROUND

Wireless devices such as terminals are also known as e.g. User Equipments (UEs), mobile terminals, stations (STAs), wireless terminals, communication devices and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or tablets with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or Base Transceiver Station (BTS), depending on the technology and terminology used. The base stations may be of different classes such as e.g. macro eNodeB, home eNodeB, micro eNodeB or pico base station, based on transmission power, functional capabilities and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipment. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO systems.

A Wireless Local Area Network (WLAN) is a wireless communications network that links two or more communications devices using a wireless distribution method, such as spread-spectrum or OFDM radio, within a limited area such as a home, school, computer laboratory, or office building. This gives users the ability to move around within a local coverage area and yet still be connected to the communications network. A WLAN can also provide a connection to the wider Internet.

Most modern WLANs are based on the Institute of Electrical and Electronics Engineers (IEEE) 802.11 standards and are marketed under the Wi-Fi brand name.

The IEEE 802.11 is a set of Media Access Control (MAC) and Physical layer (PHY) specifications for implementing WLAN communication in the 900 MHz and 2.4, 3.6, 5, and 60 GHz frequency bands. They are created and maintained by the IEEE LAN/MAN Standards Committee (IEEE 802).

Ultra-Lean System Design of NeXt Generation (NX) Communications Systems

One design principle currently under consideration for the NX Generation communications systems, also known as Next Radio (NR) in 3GPP context, is to base it on an ultra-lean design. For example, this implies to avoid as much as possible transmissions of so called "always on signals" from the communications network. Expected benefits from such design principle as compared to communications network comprising transmissions of always on signals are expected to be significantly lower energy consumption in the communications network, better scalability, e.g. a larger number of users may be supported within a given area, higher degree of forward compatibility during the RAT evolution phase, lower interference from system overhead signals and consequently higher throughput in low load scenario, and improved support for user centric beamforming.

Heavy Use of Beam-Forming, e.g. Massive Beam-Forming

Advanced Antenna Systems (AAS) is an area wherein technology has advanced significantly in recent years and wherein a rapid technology development in the years to come is foreseen. Hence it is natural to assume that advanced antenna systems in general and massive MIMO transmission and reception in particular will be a cornerstone in a future NX communications network.

Mobility Reference Signals (MRSs)

In deployments with large antenna arrays and many possible candidate beam configurations, all beams cannot transmit reference and measurement signals in an always-on, static manner for the sake of mobility measurements. Instead, the connected Access Nodes (ANs) select a relevant set of mobility beams to transmit when required. Each mobility beam carries a unique Mobility Reference signal (MRS) in the downlink. A wireless device operating in the communications network is then instructed to measure on an MRS, e.g. a configured MRS, and report the result to the communications network, e.g. to a serving AN. Based on some criteria, for example a difference between an MRS strength between two mobility beams, a handover may be triggered. For mobility to work efficiently, the involved ANs, e.g. the serving AN and one or more target ANs, need to maintain beam neighbor lists, exchange beam information, and coordinate MRS usage.

In the case of uplink measurement based mobility procedure, the wireless device is configured with UL sync (synchronization) signal resources, such as Uplink Synchronization Signals (USSs) that are transmitted by the wireless device in the UL and is listened to by one or several ANs. Based on the received USS's signal strength and some further calibration based on the node capabilities in terms of beamforming, a handover decision and/or a beam-switch decision will be taken.

Both the MRS, e.g. the mobility related reference signal in the DL, and the USS, e.g. the mobility related reference signal in the UL, are expected to be transmitted on-demand and not all the wireless devices are configured to measure on it all the time. It is also to be noted that the amount of unique sequences that are available for MRS and USS are limited to the order of approximately 170 and approximately 70, respectively. Considering that one will have many beams, e.g. hundreds of beams, being transmitted from the same AN, the allocation of MRS may be problematic and also, the allocation of unique USS resources for each wireless device in a densely packed cell having frequent mobility event may be problematic.

As mentioned above, there exist approximately 70 unique USS sequences that may be detected orthogonally by the ANs. Adding time-frequency separation will further increase the orthogonal space for allocating the USS resources but it will also mean that many ANs need to 'reserve' these resources for their respective usage. Therefore, it is to be noted that though the USS resources may also be spread in a time-frequency grid, in a dense AN serving many wireless devices, such an allocation may 'waste' many UL resources and thus potentially causing a drop in performance.

In an Uplink-based HandOver (UHO) procedure, each wireless device that is under consideration for HO, is requested to perform uplink sounding that is followed with a synchronization with a target AN's Mobility Reference Signal (MRS). This procedure is illustrated on a high level in FIG. 1. As schematically illustrated, a source AN, e.g. a serving AN, transmits a respective measurement control configuration denoted Meas. Control 1 and Meas. Control 2, to a first wireless device denoted UE1 and a second wireless device denoted UE2 operating in a communications network and being served by the source AN. The respective measurement control configuration configures the first wireless device UE1 to transmit a first uplink sounding reference signal denoted Uplink sounding 1 in FIG. 1, and the second wireless device UE2 to transmit a second uplink sounding reference signal denoted Uplink sounding 2 in FIG. 1. The first and second uplink sounding reference signals are received by the source AN and by a target AN. Based on the received first and second uplink sounding reference signals the source AN makes a handover decision. If the source AN decides that the first and second wireless devices are to be handed over to the target AN, the source AN instructs the target AN to perform the handover whereupon the target AN transmits a respective MRS synchronization signal, denoted MRS synch 1 and MRS synch 2, respectively, to the first and second wireless devices.

Thus in an Uplink-based HandOver (UHO) procedure the wireless devices that are in need of HO need to transmit uplink sounding signals, e.g. to transmit the uplink Sounding Reference Signals (SRSs) to one or more ANs operating in the communications network. The Uplink SRS is used by the respective AN to evaluate the channel quality of an uplink path between the wireless device and the respective AN, and to evaluate the uplink timing transmission. As previously mentioned, the transmission of uplink sounding signals is limited by the total number of orthogonal uplink sounding sequences. If there are many wireless devices in need for HO, the procedure will be limited. Also, since there are several other procedures that depend on uplink sounding, the UHO will be limited even for a few wireless devices if other wireless devices exist that have allocated uplink sounding sequences for other purposes. This is a very limiting scaling problem in the number of wireless devices in a cell served by a node that an UHO procedure has.

SUMMARY

Embodiments disclosed herein aim to solve the above-mentioned scaling problem and enable the ANs to have an increased number of connected wireless devices that may utilize UHO and its benefits. Thus, an object of embodiments herein is to address at least some of the drawbacks with the prior art and to improve the performance in a wireless communications network.

According to one aspect of embodiments herein, the object is achieved by a method performed by a first network node for enabling handover of a first wireless device and a second wireless device from the first network node to a second network node. The first network node, the first wireless device, the second wireless device and the second network node operate in a wireless communications network.

The first network node determines that the second wireless device is to refrain from transmitting an uplink synchronization signal.

Based on the determination, the first network node configures the first wireless device to transmit an uplink synchronization signal and to synchronize to a first downlink synchronization signal, and configures the second wireless device to synchronize to a second downlink synchronization signal.

The first network node receives, from the second network node, information relating to a measurement performed on the uplink synchronization signal transmitted only from the first wireless device.

Based on the received information, the first network node requests the second network node to perform the handover of the first and second wireless devices.

According to another aspect of embodiments herein, the object is achieved by a first network node for enabling handover of a first wireless device and a second wireless device from the first network node to a second network node. The first network node, the first wireless device, the second wireless device and the second network node are configured to operate in a wireless communications network.

The first network node is configured to determine that the second wireless device is to refrain from transmitting an uplink synchronization signal.

Based on the determination, the first network node is configured to configure the first wireless device to transmit an uplink synchronization signal and to synchronize to a first downlink synchronization signal, and is configured to configure the second wireless device to synchronize to a second downlink synchronization signal.

The first network node is configured to receive, from the second network node, information relating to a measurement performed on the uplink synchronization signal transmitted only from the first wireless device.

Based on the received information, the first network node is configured to request the second network node to perform the handover of the first and second wireless devices.

According to another aspect of embodiments herein, the object is achieved by a method performed by a second network node for performing a handover of a first wireless device and a second wireless device from a first network node to the second network node. The first network node, the first wireless device, the second wireless device and the second network node operate in a wireless communications network.

The second network node transmits, to the first network node, a result of a measurement performed on an uplink synchronisation signal transmitted only from the first wireless device.

Based on a handover request received from the first network node, the second network node performs a handover, from the first network node to the second network node, of the first wireless device and the second wireless device refraining from transmitting an uplink synchronization signal.

According to another aspect of embodiments herein, the object is achieved by a second network node for performing a handover of a first wireless device and a second wireless device from a first network node to the second network node. The first network node, the first wireless device, the second wireless device and the second network node are configured to operate in a wireless communications network.

The second network node is configured to transmit, to the first network node, a result of a measurement performed on an uplink synchronisation signal transmitted only from the first wireless device.

Based on a handover request received from the first network node, the second network node is configured to perform a handover, from the first network node to the second network node, of the first wireless device and the second wireless device refraining from transmitting an uplink synchronization signal.

According to another aspect of embodiments herein, the object is achieved by a computer program, comprising instructions which, when executed on at least one processor, causes the at least one processor to carry out the method performed by the first network node.

According to another aspect of embodiments herein, the object is achieved by a computer program, comprising instructions which, when executed on at least one processor, causes the at least one processor to carry out the method performed by the second network node.

According to another aspect of embodiments herein, the object is achieved by a computer program, comprising instructions which, when executed on at least one processor, causes the at least one processor to carry out the method performed by the communications device.

According to another aspect of embodiments herein, the object is achieved by a carrier comprising the computer program, wherein the carrier is one of an electronic signal, an optical signal, a radio signal or a computer readable storage medium.

Since the first network node determines that the second wireless device is to refrain from transmitting an uplink synchronization signal, since the first network node configures the first wireless device to transmit an uplink synchronization signal and to synchronize to a first downlink synchronization signal, and configures the second wireless device to synchronize to a second downlink synchronization signal based on the determination and since the first network node requests the second network node to perform the handover of the first and second wireless devices based on information relating to a measurement performed on the uplink synchronization signal transmitted only from the first wireless device, the number of uplink synchronization signals needed for performing handover is reduced. That results in an improved performance in the wireless communications network.

An advantage of some embodiments herein is that the scaling issue of the number of uplink orthogonal sequences when the number of wireless devices becomes large is mitigated.

Another advantage of some embodiments herein is that they enable uplink handover, with all its benefits of being robust and very fast, for an arbitrary number of wireless devices operating within a coverage area of the network node.

Yet another advantage of some embodiments herein is that the handover of multiple wireless devices at once also has the advantage of providing more controllable interference handling since wireless devices that are closely located in terms of radio coverage are likely to be handed over together. Thereby keeping them to be served by the same network node that will have more control over the transmissions to them and the interference they create.

BRIEF DESCRIPTION OF DRAWINGS

Examples of embodiments herein are described in more detail with reference to attached drawings in which:

FIG. 6 is a flowchart schematically illustrating embodiments of a method performed by a second Network Node (NN);

FIG. 7 is a block diagram schematically illustrating embodiments of a second NN; and FIG. 8 is a schematic combined flowchart and signalling scheme illustrating embodiments of a handover procedure in a wireless communications network.

DETAILED DESCRIPTION

Some embodiments disclosed herein relate to recent technology trends that are of particular interest in the 5G context. However, it should be understood that embodiments disclosed herein may be applicable also in 4G communications network and in future communications networks.

Some embodiments disclosed herein relates to a flexible RRC configuration that will be used to configure different wireless devices operating within the coverage area of an AN, e.g. a first Network Node (NN), with different roles. This results in a reduced burden of transmission of UL signals from certain wireless devices while at the same time not sacrificing the handover decisions for such wireless devices. Some embodiments disclosed herein comprise configuration of a first set of wireless devices to perform the an UL measurement based HO procedure and at the same time also configuration of a second set of wireless devices to get DL sync signal from the AN chosen based on the UL measurement based HO procedure carried out for the said first set of wireless devices.

The first set of wireless devices comprises one or more first wireless devices, and the second set of wireless devices comprises one or more second wireless devices. In this disclosure, reference is made to a first and a second wireless device. However, it should be understood that the disclosure is equally applicable to the first set of wireless devices and the second set of wireless devices.

The DL signal, e.g. the MRS, transmitted for providing the DL sync signal to the first wireless device performing the UL measurement based handover will be used as an implicit HO command for the second wireless device that is configured to listen to the DL sync signal from the chosen AN, e.g. a second NN.

Figure 1:
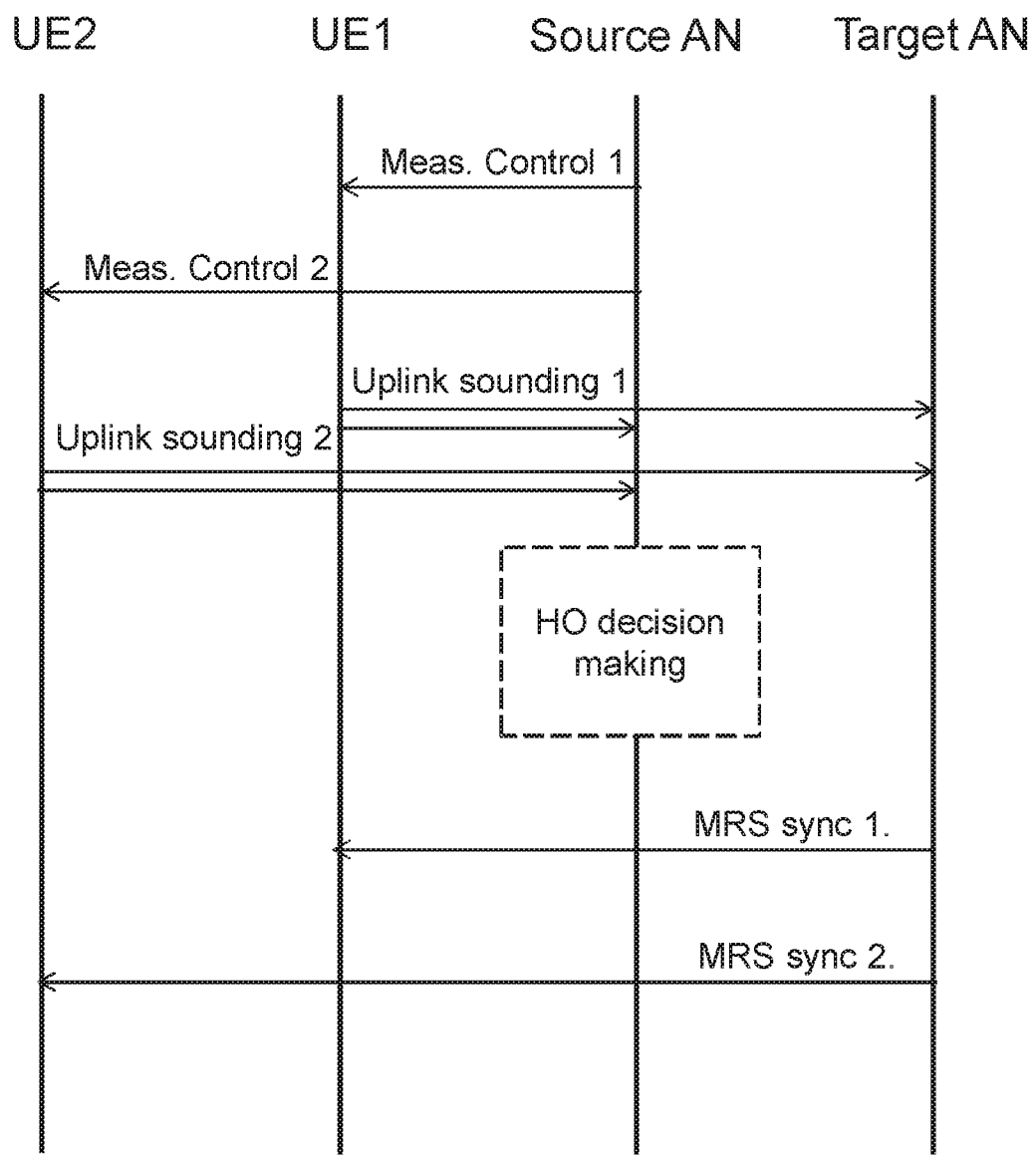
FIG. 1 is a schematic combined flowchart and signalling scheme illustrating a handover procedure in a communications network according to prior art.
Figure 2:
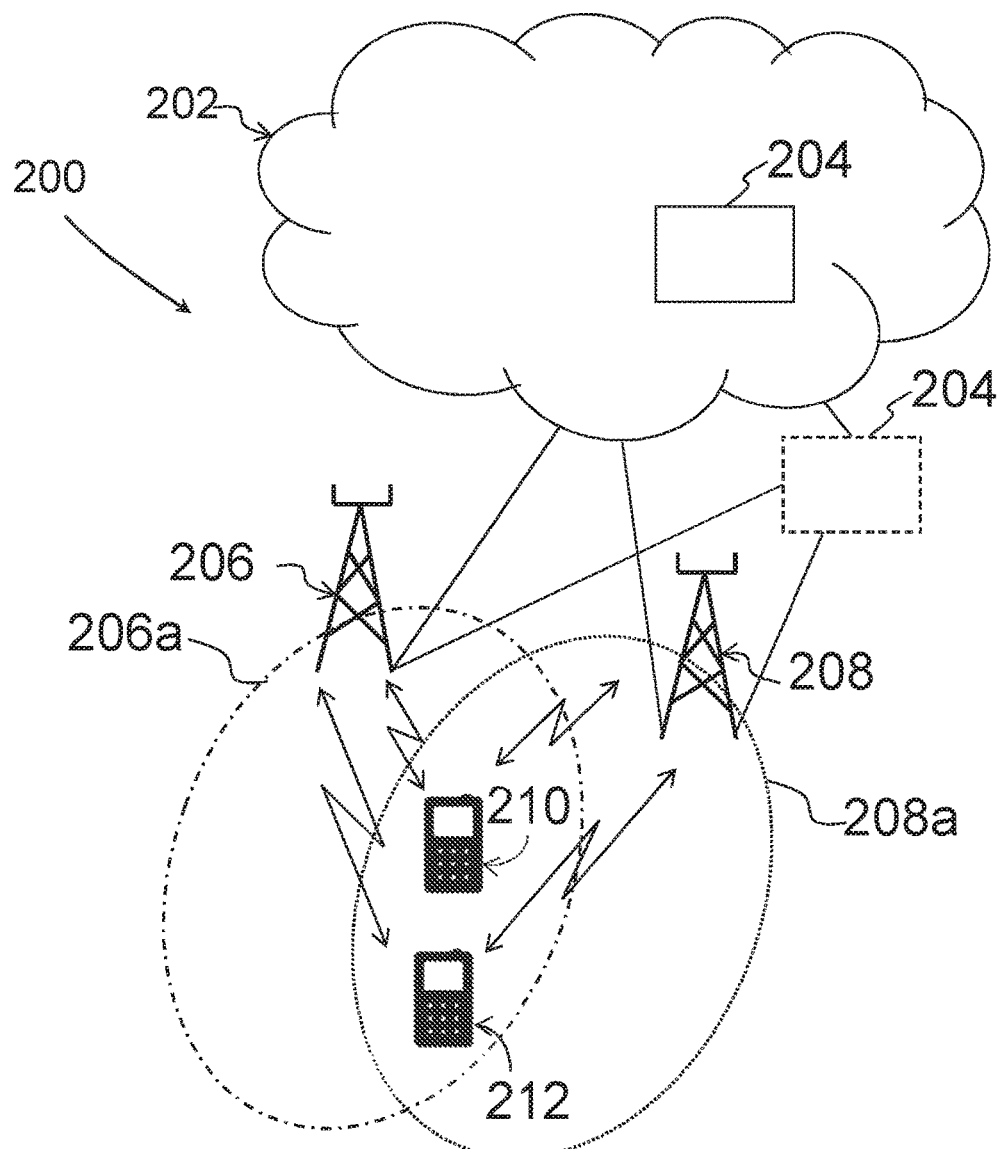
FIG. 2 is a schematic block diagram schematically illustrating embodiments of a wireless communications network.

As schematically illustrated in FIG. 2, embodiments herein relate to a wireless communications network 200. The wireless communications network 200 may be an NX communications network, an Universal Mobile Telecommunications System (UMTS) network, a Long-Term Evolution (LTE) network, a Wideband Code Division Multiple Access (WCDMA) network, a Global System for Mobile Communications (GSM) network, any 3GPP cellular network, a Worldwide Interoperability for Microwave Access (Wimax) network, or any other wireless communication network or system configured to support MTC.

The wireless communications network 200 comprises a core network 202. The core network 202 may be an NX core network, an UMTS core network, a LTE core network, a WCDMA core network, an GSM core network, any 3GPP cellular core network, a Wimax core network, or a core network of any other wireless communication network or system configured to support MTC.

A core network node 204 may be comprised in or arranged in communication with the core network 202. The core network node 204 may be a Radio Network Controller (RNC) operating in an UMTS network. In some embodiments, the core network node 204 is a Base Station Controller (BSC), a Mobile Switching Center (MSC), a media Gateway (MGw), a Serving GPRS Support Node (SGSN) or a Mobility Management Entity (MME). Further, in some embodiments, the network node 104 is a base station.

A first Network Node (NN) 206 is arranged and configured to operate in the wireless communication network 200. The second NN 206 is configured for wireless communication with wireless devices, such as a first wireless device 210 and a second wireless device 212, when they are located within a first coverage area 206a served by the first network node 206. The first coverage area 206a is sometimes referred to as a cell, a radio coverage area, or a cluster.

The first network node 206 may be a transmission point such as a radio base station, for example a gNB, an eNB, an eNodeB, or an Home Node B, an Home eNode B or any other network node capable to serve a user equipment or a machine type communication device in a wireless communications network, such as the wireless communications network 200. The first network node 206 may further be configured to communicate with the core network node 204.

A second Network Node (NN) 208 is arranged and configured to operate in the wireless communication network 200. The second network node 208 is configured for wireless communication with wireless devices, such as a first wireless device 210 and a second wireless device 212, when they are located within a second coverage area 208a served by the second network node 208. The second coverage area 208a is sometimes referred to as a cell, a radio coverage area, or a cluster.

The second network node 208 may be a transmission point such as a radio base station, for example a gNB, an eNB, an eNodeB, or an Home Node B, an Home eNode B or any other network node capable to serve a user equipment or a machine type communication device in a wireless communications network, such as the wireless communications network 200. The second network node 208 may further be configured to communicate with the core network node 204.

The first and second wireless devices 210, 212, herein also referred to as MTC devices, user equipments or UEs, operate in the wireless communications network 200. The first and second wireless devices 210, 212 may also be referred to as wireless communications devices. The first and second wireless devices 210, 212 may e.g. be user equipment, mobile terminals or wireless terminals, mobile phones, computers such as e.g. laptop, Personal Digital Assistants (PDAs) or tablet computers, sometimes referred to as tablets, with wireless capability, or any other radio network units capable to communicate over a radio link in the wireless communications network 200. Please note the term user equipment used in this document also covers other wireless devices such as Machine to Machine (M2M) devices, even though they do not have any user.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 3:
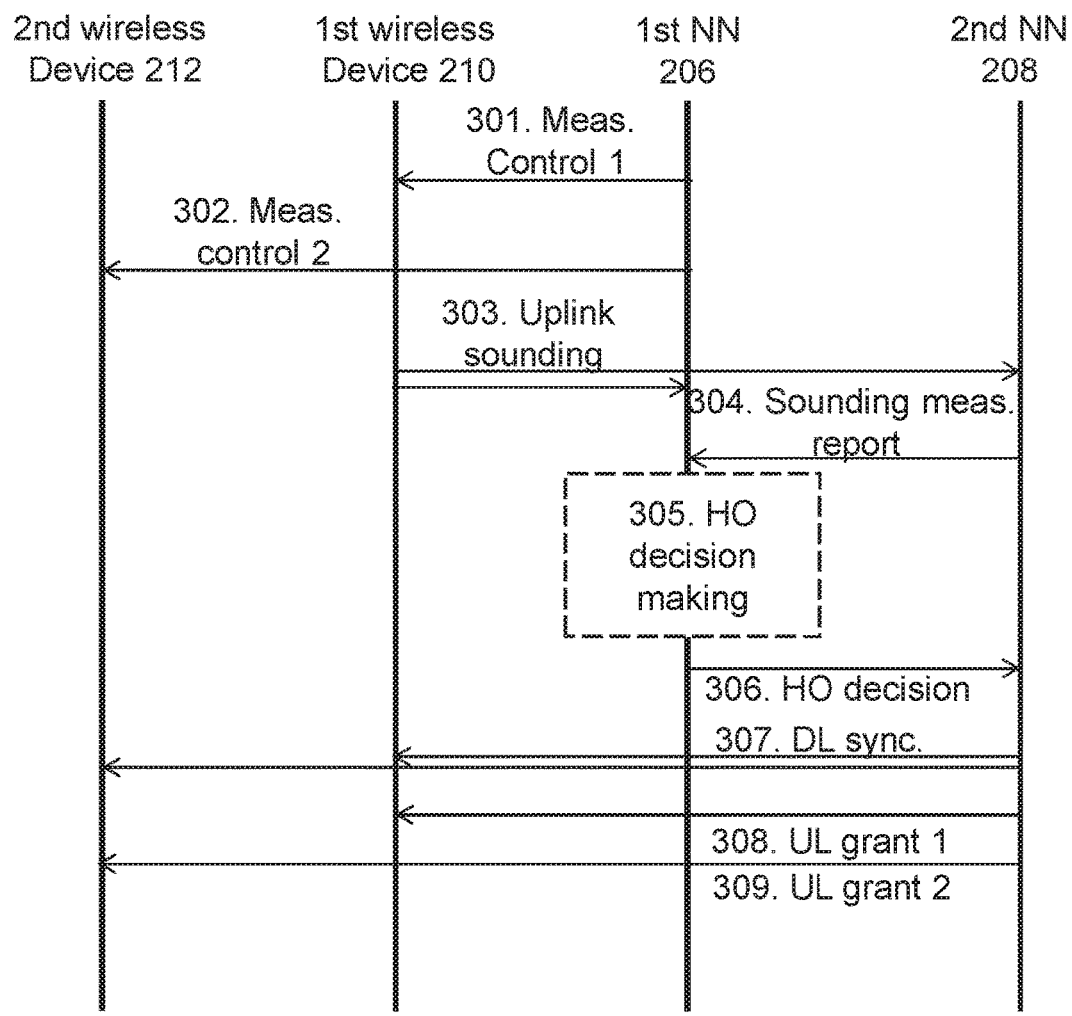
FIG. 3 is a schematic combined flowchart and signalling scheme illustrating embodiments of a handover procedure in a wireless communications network.

The procedure of some embodiments disclosed herein is illustrated in FIG. 3. FIG. 3 is a schematic combined flowchart and signalling scheme illustrating embodiments of a handover procedure in the wireless communications network 200. The first network node 206, the second network node 208, the first wireless device 210 and the second wireless device 212 are operating in the wireless communications network work 200. One or more of the Actions below may be combined and/or performed in another suitable order. Further, one or more actions may be optional.

In Actions 301 and 302, the first and second wireless devices 210,212 receives a respective measurement control configuration from the first network node 206, e.g. from the serving AN. The respective measurement control configurations are denoted Meas. control 1 and Meas. control 2, respectively in FIG. 3. In other words, the first network node 206 transmits a respective measurement control configuration to the first and second wireless devices 210, 212. The measurement control configurations Meas. control 1 and Meas. control 2 are sometimes in this disclosure referred to as a first uplink synchronization signal configuration and a second uplink synchronization signal configuration, respectively.

The first measurement control configuration Meas. control 1 configures the first wireless device 210 to transmit an uplink synchronization signal denoted Uplink sounding in FIG. 3, to listen to and synchronize with a downlink synchronization signal DL sync. In other words, the first wireless device 210 will be configured to monitor and re-align to the downlink synchronization signal. This downlink synchronization signal is sometimes in this disclosure referred to as a first downlink synchronization signal.

The second measurement control configuration Meas. control 2 configures the second wireless device 212 to listen to the downlink synchronization signal DL sync and to synchronize to the downlink synchronization signal DL sync. Thus, the second wireless device 212 receives a modified measurement control configuration as compared to the first wireless device 210 such that the second measurement control configuration Meas. control 2 as being modified comprises no configuration to transmit any uplink synchronization signal, but only a downlink synchronization sequence that the second wireless device 212 is supposed to listen to and to synchronize with, e.g. to which signal it should perform a synchronization such as a re-synchronization. In other words, the second wireless device 212 will be configured to monitor and re-align to the downlink synchronization signal. This downlink synchronization signal is sometimes in this disclosure referred to as a second downlink synchronization signal.

In Action 303, the first wireless device 210 transmits uplink synchronization signals, referred to as Uplink sounding in FIG. 3. As previously mentioned, the measurement control configuration transmitted to the second wireless device 212 only comprise the downlink synchronization sequence, and since the second wireless device 212 is not configured to transmit any uplink synchronization signals it is only the first wireless device 210 that is transmitting uplink synchronization signals.

In Action 304, the second network node 208 transmits a measurement report to the first network node 206. The measurement report comprises information relating to a measurement performed by the second network node 208 on a received uplink synchronization signal.

In Action 305, the first network node 206 takes a handover decision based on for example a received measurement report from the second network node 208. The handover decision may also be based on a measurement performed by the first NN 206 on a received uplink synchronization signal from the first wireless device 210.

In Action 306, the first network node 206 instructs the second network node 208 to perform a handover of the first and second wireless devices 210,212 from the first NN 206 to the second network node 208.

In Action 307-309, the second network node 206 performs the handover. In Action 307, the second network node 206 transmits the downlink synchronization signal to the first wireless device 210 and to the second wireless device 212. In Actions 308 and 309, a respective uplink grant is transmitted to the first and second wireless devices 210, 212. The respective uplink grant is denoted UL grant 1 and UL grant 2 in FIG. 3 and comprises information relating to respective allocated resources for communication for the first wireless device 210 and the second wireless device 212, respectively.

Figure 4:
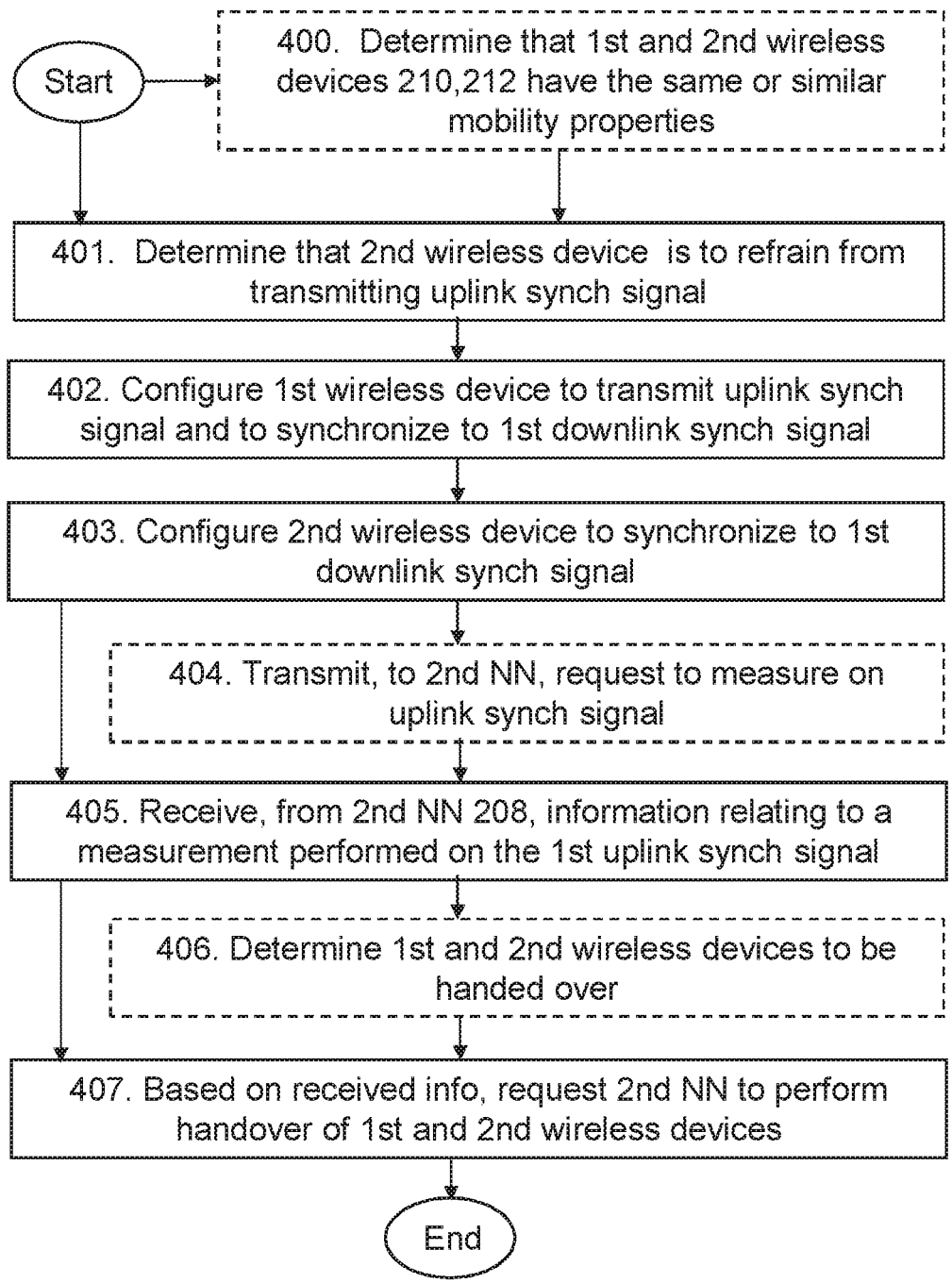
FIG. 4 is a flowchart schematically illustrating embodiments of a method performed by a first Network Node (NN)

An example of a method performed by the first network node 206 for enabling handover of the first wireless device 210 and the second wireless device 212 from the first network node 206 to the second network node 208, will now be described with reference to the flowchart depicted in FIG. 4. The first network node 206, the first wireless device 210, the second wireless device 212 and the second network node 208 operate in the wireless communications network 200.

The first and second wireless devices 210,212 may be identified with a respective identifier, and the respective identifier may be one or more out of: a DeModulation Reference Signal Identity (DMRS ID), a scrambling ID, and a security key.

One or more of the Actions below may be combined and/or performed in another suitable order. Further, one or more actions may be optional.

Action 400

The first network node 206 may determine that the first wireless device 210 and the second wireless device 212 have the same or similar mobility properties.

By the expression "the same or similar mobility properties" when used in this disclosures is for example meant that the first and second wireless devices 210, 212 share similar radio characteristics, for example the same or similar signal quality measurements for one or more network nodes, e.g. the first network node 206 and/or the second network node 208. It may also be meant that their signal quality over time is similar, for example that their signal quality drops with a number of signal quality units over time toward the first network node 206. It may also be meant that they are close in terms of their geographical location. It may also be meant that they have similar geographical location over time, for example they are moving in a certain direction. It may also be meant that they share same distance or/and angle towards the first network node 206. The distance may be acquired for example via Timing Advance (TA), and the angle may be estimated from any uplink signal transmitted from the first and second wireless devices 210, 212 to the first network node 206. It may also be based on a time series of TA and angle estimates.

By determining that the first and second wireless devices 210, 212 have the same or similar mobility properties, the first network node 206 may determine that both of them should be handed over to the second network node 208 based on transmission of an uplink synchronization signal from only one of them, e.g. from the first wireless device 210. Thereby, the handover decision is taken on a reduced number of transmitted uplink synchronization signals as compared to the prior art. This will be described in more detail below.

Action 401

The first network node 206 determines that the second wireless device 212 is to refrain from transmitting an uplink synchronization signal. This may be based on that the first network node 206 has determined that the first wireless device 210 and the second wireless device 212 have the same or similar mobility properties in the action above. Thus, by embodiments herein and as will be described in more detail below, a decision to handover the first and second wireless devices 210, 212 may be taken based on a transmitted uplink synchronization signal from only one out of the two wireless devices, e.g. from the first wireless device 210.

Action 402

Based on the determination in Action 401, the first network node 206 configures the first wireless device 210 to transmit an uplink synchronization signal and to synchronize to a first downlink synchronization signal. Thus, since the second wireless device 212 is to refrain from transmitting the uplink synchronization signal, the network node 206 configures the first wireless device 210 to transmit the uplink synchronization signal.

Further, by configuring the first wireless device 210 to synchronize to the first downlink synchronization signal, the first wireless device 210 may be handed over to a target network node, e.g. the second network node 208, transmitting the first downlink synchronization signal.

The uplink synchronization signal may be an uplink sounding reference signal.

In some embodiments, the first downlink synchronisation signal is a first MRS or a first downlink mobility related reference signal such as an on-demand synchronization signal such as an DMRS or an additional Primary Synchronization Signal (PSS) or an additional Secondary Synchronization Signal (SSS).

In some embodiments, the first network node 206 configures the first wireless device 210 to transmit the uplink synchronization signal and to synchronize to the first downlink synchronization signal by transmitting, to the first wireless device 210, a first set of configuration parameters that configures the first wireless device 210 to transmit the uplink synchronization signal and to synchronize to the first downlink synchronization signal.

Action 403

Further, based on the determination in Action 401, the first network node 206 configures the second wireless device 212 to synchronize to a second downlink synchronization signal. Thereby, the second wireless device 212 may be handed over to a target network node, e.g. the second network node 208, transmitting the second downlink synchronization signal.

In some embodiments, the second downlink synchronisation signal is a second MRS or a second downlink mobility related reference signal such as an on-demand synchronization signal such as an DMRS or an additional PSS or SSS.

In some embodiments, the first network node 206 configures the second wireless device 212 to synchronize to the second downlink synchronization signal by transmitting, to the second wireless device 212, a second set of configuration parameters that configures the second wireless device 212 synchronize to the second downlink synchronization signal.

In some embodiments, the first and second downlink synchronization signals are the same downlink synchronization signal to be transmitted from the second network node 208 and received by the respective first and second wireless device 210,212. Thus, the first network node 206 may configure the first and second wireless devices 210,212 to listen to the same downlink synchronization signal such as the same MRS.

Action 404

In some embodiments, the first network node 206 transmits, to the second network node 208, a request to measure the uplink synchronization signal transmitted from the first wireless device 210. Thus, the first network node 206 may instruct the second network node 208 to perform one or more measurements on received uplink synchronization signals. Additionally or alternatively, the first network node 208 may instruct the second network node 208 to transmit information relating to one or more measurement results to the first network node 206. This may for example be the case when the first network node 206 is a serving AN and the second network node 208 is a target AN, e.g. one target AN out of a plurality of target ANs.

Action 405

The first network node 206 receives, from the second network node 208, information relating to a measurement performed on the uplink synchronization signal transmitted only from the first wireless device 210. Thereby, the first network node 206 may be informed of a signal quality of the uplink synchronization signal received at the second network node 208, and thus the first network node 206 may determine a quality of the transmission path between the first wireless device 210 and the second network node 208.

Action 406

In some embodiments and based on the received information, the first network node 206 determines that the first wireless device 210 and the second wireless device 212 are to be handed over from the first network node 206 to the second network node 208.

The first network node 206 may determine that the first wireless device 210 and the second wireless device 212 are to be handed over when the received information comprises information relating to a first signal quality measured at the second network node 208 and when at least one out of:
 the first signal quality is above a signal quality threshold;
 the first signal quality is better than a second signal quality measured at the first network node 206; and/or
 the first signal quality is an amount of signal quality units better than the second signal quality measured at the first network node 206.

The signal quality units may be given in Decibel (dB).

Action 407

Based on the received information, the first network node 206 requests the second network node 208 to perform the handover of the first and second wireless devices 210, 212.

In some embodiments, when the first network node 206 has determined that the first wireless device 210 and the second wireless device 212 are to be handed over from the first network node 206 to the second network node 208 as described in Action 406 above, the first network node 206 requests the second network node 208 to perform the handover by transmitting, to the second network node 208, a handover request requesting the second network node 208 to perform the handover.

The handover request may comprise information relating to the first downlink synchronization signal and/or to the second downlink synchronization signal.

Further, the handover request may request the second network node 208 to transmit the first downlink synchronization signal and/or the second downlink synchronization signal to the respective first and/or second wireless device 210,212.

Figure 5:
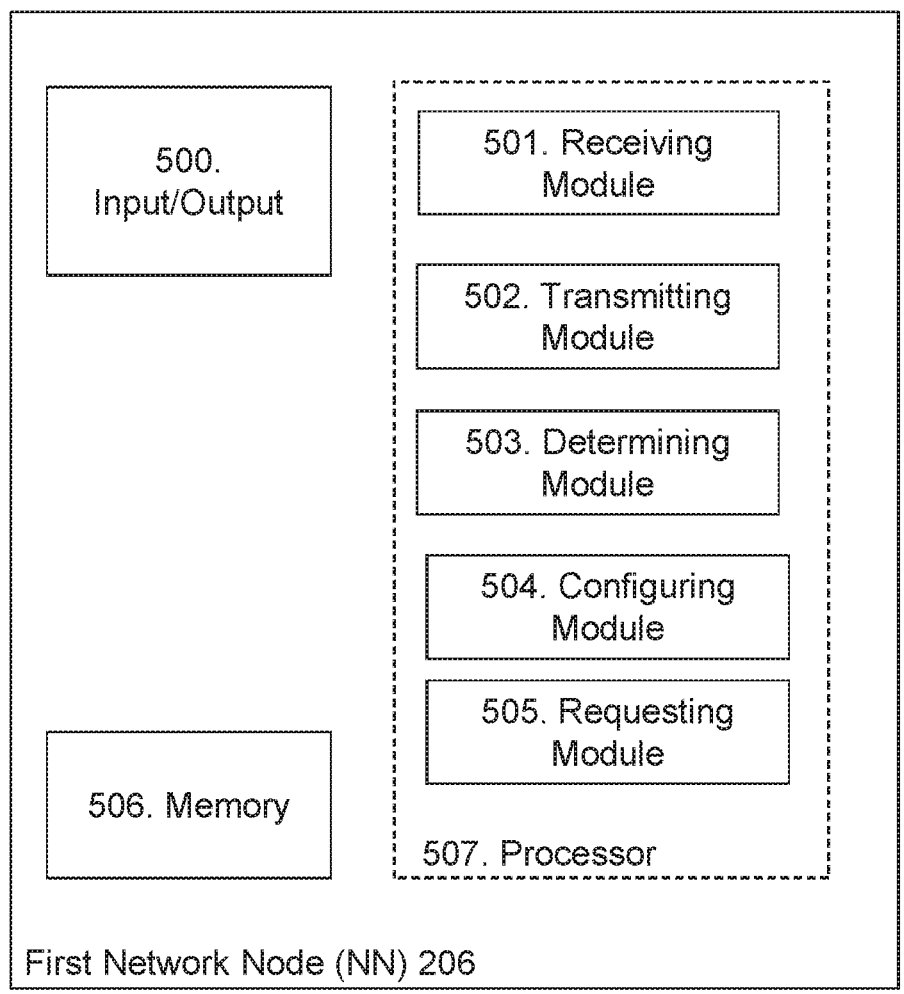
FIG. 5 is a block diagram schematically illustrating embodiments of a first NN.

To perform the method for enabling handover of the first wireless device 210 and the second wireless device 212 from the first network node 206 to the second network node 208, the first network node 206 may be configured according to an arrangement depicted in FIG. 5. As previously mentioned, the first network node 206, the first wireless device 210, the second wireless device 212 and the second network node 208 operate in the wireless communications network 200.

The first and second wireless devices 210,212 may be identified with a respective identifier, and the respective identifier may be one or more out of: a DeModulation Reference Signal Identity (DMRS ID), a scrambling ID, and a security key.

The first network node 206 comprises an Input and output Interface 500 configured to communicate, with one or more wireless devices, e.g. the first and second wireless devices 210,212, or with one or more other network nodes, e.g. the second network node 208, operating in the wireless communications network 200. The input and output interface 500 may comprise a wireless receiver (not shown) and a wireless transmitter (not shown).

The first network node 206 is configured to receive, e.g. by means of a receiving module 501 configured to receive, a transmission from one or more wireless devices, e.g. the first and second wireless devices 210,212, or from one or more other network nodes, e.g. the second network node 208. The receiving module 501 may be implemented by or arranged in communication with the processor 507 of the first network node 206.

The first network node 206 is configured to receive, from the second network node 208, information relating to a measurement performed on the uplink synchronization signal transmitted only from the first wireless device 210.

The first network node 206 is configured to transmit, e.g. by means of a transmitting module 502 configured to transmit, a transmission to one or more wireless devices, e.g. the first and second wireless devices 210,212, or to one or more other network nodes, e.g. the second network node 208. The transmitting module 502 may be implemented by or arranged in communication with the processor 507 of the first network node 206.

In some embodiments, the first network node 206 is configured to transmit, to the second network node 208, a request to measure the uplink synchronization signal transmitted from the first wireless device 210.

The first network node 206 is configured to determine, e.g. by means of a determining module 503 configured to determine, that the second wireless device 212 is to refrain from transmitting an uplink synchronization signal. The determining module 503 may be implemented by or arranged in communication with the processor 507 of the first network node 206.

In some embodiments, the first network node 206 is configured to determine that the first wireless device 210 and the second wireless device 212 have the same or similar mobility properties.

The first network node 206 may be configured to determine that the first wireless device 210 and the second wireless device 212 are to be handed over from the first network node 206 to the second network node 208 based on the received information, determine that the first wireless device 210 and the second wireless device 212 are to be handed over from the first network node 206 to the second network node 208.

In some embodiments, the first network node 206 is configured to determine that the first wireless device 210 and the second wireless device 212 are to be handed over when the received information comprises information relating to a first signal quality measured at the second network node 208 and when at least one out of:

the first signal quality is above a signal quality threshold;
the first signal quality is better than a second signal quality measured at the first network node 206; and/or
the first signal quality is an amount of signal quality units better than the second signal quality measured at the first network node 206.

The first network node 206 is configured to configure, e.g. by means of a configuring module 504 configured to configure, the first and second wireless devices 210, 212. The configuring module 504 may be implemented by or arranged in communication with the processor 507 of the first network node 206.

The first network node 206 is configured to configure the first wireless device 210 to transmit an uplink synchronization signal and to synchronize to a first downlink synchronization signal, and to configure the second wireless device 212 to synchronize to a second downlink synchronization signal. Further, the first network node 206 is configured to perform the configurations based on the determination that the second wireless device 212 is to refrain from transmitting the uplink synchronization signal.

In some embodiments, the first network node 206 is configured to configure the first wireless device 210 to transmit the uplink synchronization signal and to synchronize to the first downlink synchronization signal by further being configured to transmit, to the first wireless device 210, a first set of configuration parameters that configures the first wireless device 210 to transmit the uplink synchronization signal and to synchronize to the first downlink synchronization signal.

Further, the first network node 206 may be configured to configure the second wireless device 212 to synchronize to the second downlink synchronization signal by further being configured to transmit, to the second wireless device 212, a second set of configuration parameters that configures the second wireless device 212 synchronize to the second downlink synchronization signal.

As previously mentioned, the first and second downlink synchronization signals may be the same downlink synchronization signal to be transmitted from the second network node 208 and received by the respective first and second wireless device 210,212.

The first network node 206 is configured to request, e.g. by means of a requesting module 505 configured to request, the second network node 208 to perform handover. The requesting module 505 may be implemented by or arranged in communication with the processor 507 of the first network node 206.

The first network node 206 is configured to request the second network node 208 to perform the handover of the first and second wireless devices 210,212 based on the received information.

In some embodiments, the first network node 206 is configured to request the second network node 208 to perform the handover by being configured to transmit, to the second network node 208, a handover request requesting the second network node 208 to perform the handover.

The handover request may comprise information relating to the first downlink synchronization signal and/or to the second downlink synchronization signal.

Further, the handover request may request the second network node 208 to transmit the first downlink synchronization signal and/or the second downlink synchronization signal to the respective first and/or second wireless device 210, 212.

The first network node 206 may also comprise means for storing data. In some embodiments, the first network node 206 comprises a memory 506 configured to store the data. The data may be processed or non-processed data and/or information relating thereto. The memory 506 may comprise one or more memory units. Further, the memory 506 may be a computer data storage or a semiconductor memory such as a computer memory, a read-only memory, a volatile memory or a non-volatile memory. The memory is arranged to be used to store obtained information, data, configurations, scheduling algorithms, and applications etc. to perform the methods herein when being executed in the first network node 206.

Embodiments herein for enabling handover of the first wireless device 210 and the second wireless device 212 from the first network node 206 to the second network node 208 may be implemented through one or more processors, such as the processor 507 in the arrangement depicted in FIG. 5, together with computer program code for performing the functions and/or method actions of embodiments herein. The program code mentioned above may also be provided as a computer program product, for instance in the form of a data carrier carrying computer program code for performing the embodiments herein when being loaded into the first network node 206. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the first network node 206.

Those skilled in the art will also appreciate that the input/output interface 500, the receiving module 501, the transmitting module 502, the determining module 503, the configuring module 504 and the requesting module 505 above may refer to a combination of analog and digital circuits, and/or one or more processors configured with software and/or firmware, e.g. stored in the memory 506, that when executed by the one or more processors such as the processors in the first network node 206 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

An example of a method performed by the second network node 208 for performing a handover of the first wireless device 210 and the second wireless device 212 from the first network node 206 to the second network node 208, will now be described with reference to the flowchart depicted in FIG. 6. The first network node 206, the first wireless device 210, the second wireless device 212 and the second network node 208 operate in the wireless communications network 200.

As previously mentioned, the first and second wireless devices 210,212 may be identified with a respective identifier, and the respective identifier may be one or more out of: a DMRS ID, a scrambling ID, and a security key.

One or more of the Actions below may be combined and/or performed in another suitable order. Further, one or more actions may be optional.

Action 601

In some embodiments, the second network node 208 receives, from the first network node 206, a request to measure an uplink synchronization signal transmitted from the first wireless device 210. In other words, the second network node 208 may receive a request to perform a measurement on the uplink synchronization signal when received from the first wireless device 210. The measurement may for example be a measurement measuring a signal quality, a path loss, a timing offset, and an angle of arrival just to mention some examples.

Action 602

The second network node 208 transmits, to the first network node 206, information relating to a measurement performed on an uplink synchronisation signal transmitted only from the first wireless device 210. Thereby, the second network node 208 may inform the first network node 206 about the measurement result.

Action 603

Based on a handover request received from the first network node 206, the second network node 208 performs a handover, from the first network node 206 to the second network node 208, of the first wireless device 210 and the second wireless device 212 refraining from transmitting an uplink synchronization signal.

The handover request may comprise information relating to a first downlink synchronization signal and/or to a second downlink synchronization signal.

The first and second downlink synchronization signals may be identical synchronization signals to be transmitted in the same time-frequency resources.

In some embodiments, the second network node 208 performs the handover of the first and second wireless devices 210, 212 from the first network node 206 to the second network node 208 by transmitting the respective first and second downlink synchronization to the respective first and second wireless device 210, 212, and by transmitting, to the respective first and second wireless device 210, 212, a respective uplink grant signal.

To perform the method for performing a handover of the first wireless device 210 and the second wireless device 212 from the first network node 206 to the second network node 208, the second network node 208 may be configured according to an arrangement depicted in FIG. 7. As previously mentioned, the first network node 206, the first wireless device 210, the second wireless device 212 and the second network node 208 operate in the wireless communications network 200.

The first and second wireless devices 210,212 may be identified with a respective identifier, and the respective identifier may be one or more out of: a DeModulation Reference Signal Identity (DMRS ID), a scrambling ID, and a security key.

The second network node 208 comprises an input and output interface 700 configured to communicate, with one or more wireless devices, e.g. the first and second wireless devices 210,212, or with one or more other network nodes, e.g. the first network node 206, operating in the wireless communications network 200. The input and output interface 700 may comprise a wireless receiver (not shown) and a wireless transmitter (not shown).

The second network node 208 is configured to receive, e.g. by means of a receiving module 701 configured to receive, a transmission from one or more wireless devices, e.g. the first and second wireless devices 210,212, or from one or more other network nodes, e.g. the first network node 206. The receiving module 701 may be implemented by or arranged in communication with the processor 705 of the second network node 208.

In some embodiments, the second network node 208 is configured to receive, from the first network node 206, a request to measure the uplink synchronization signal transmitted from the first wireless device 210.

The second network node 208 is configured to transmit, e.g. by means of a transmitting module 702 configured to transmit, a transmission to one or more wireless devices, e.g. the first and second wireless devices 210,212, or to one or more other network nodes, e.g. the first network node 206. The transmitting module 702 may be implemented by or arranged in communication with the processor 705 of the second network node 208.

The second network node 208 is configured to transmit, to the first network node 206, information relating to a measurement performed on an uplink synchronisation signal transmitted only from the first wireless device 210.

The second network node 208 is configured to perform, e.g. by means of a performing module 703 configured to perform, a handover. The performing module 703 may be implemented by or arranged in communication with the processor 705 of the second network node 208.

The second network node 208 is configured to perform, based on a handover request received from the first network node 206, a handover, from the first network node 206 to the second network node 208, of the first wireless device 210 and the second wireless device 212 configured to refrain from transmitting an uplink synchronisation signal.

The handover request may comprise information relating to a first downlink synchronization signal and/or to a second downlink synchronization signal.

In some embodiments, the first and second downlink synchronization signals are identical synchronization signals to be transmitted in the same time-frequency resources.

The second network node 208 may be configured to perform the handover of the first and second wireless devices 210, 212 from the first network node 206 to the second network node 208 by being configured to transmit the respective first and second downlink synchronization to the respective first and second wireless device 210, 212 and by being configured to transmit, to the respective first and second wireless device 210,212, a respective uplink grant signal.

The second network node 208 may also comprise means for storing data. In some embodiments, the second network node 208 comprises a memory 704 configured to store the data. The data may be processed or non-processed data and/or information relating thereto. The memory 704 may comprise one or more memory units. Further, the memory 704 may be a computer data storage or a semiconductor memory such as a computer memory, a read-only memory, a volatile memory or a non-volatile memory. The memory is arranged to be used to store obtained information, data, configurations, scheduling algorithms, and applications etc. to perform the methods herein when being executed in the second network node 208.

Embodiments herein for performing a handover of the first wireless device 210 and the second wireless device 212 from the first network node 206 to the second network node 208 may be implemented through one or more processors, such as the processor 705 in the arrangement depicted in FIG. 7, together with computer program code for performing the functions and/or method actions of embodiments herein. The program code mentioned above may also be provided as a computer program product, for instance in the form of a data carrier carrying computer program code for performing the embodiments herein when being loaded into the second network node 208. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the second network node 208.

Those skilled in the art will also appreciate that the input/output interface 700, the receiving module 701, the transmitting module 702, and the performing module 503 above may refer to a combination of analog and digital circuits, and/or one or more processors configured with software and/or firmware, e.g. stored in the memory 704, that when executed by the one or more processors such as the processors in the second network node 208 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

FIG. 8 is a schematic combined flowchart and signalling scheme illustrating embodiments of a handover procedure in the wireless communications network 200. As previously mentioned, the first network node 206, the second network node 208, the first wireless device 210 and the second wireless device 212 operates in the wireless communications network 200.

In FIG. 8 exemplifying layers for the transmissions are shown. However, the layers should only be seen as examples and it should be understood that other suitable layers than those shown may be used.

Further, FIG. 8 schematically illustrates a detailed example of the high level procedure of FIG. 3 previously described. Thus, one or more of the Actions described in relation to FIG. 3 relate to one or more of the Actions in FIG. 8.

Furthermore, one or more of the Actions may be optional and actions may be combined. Further, it should be understood that actions may be performed in another suitable order.

In Action 801 user data is transmitted between the first network node 206 and the respective one of the first wireless device 210 and the second wireless device 212.

In Action 802, the first network node 206 performs a beam relation mapping. This means that the first network node 206 performs identification of one or more neighbouring network nodes, e.g. of the second network node 208, which node(-s) potentially may serve the wireless device 210. Thus, one or more nodes being candidates as one or more target nodes for handover may be identified.

In Action 803, the first network node 206 requests the one or more identified neighbouring nodes, e.g. the second network node 208, to reserve the uplink synchronization resources that the wireless device 210 will be informed about. This is done in order to avoid the use of the same uplink resource by multiple neighbouring nodes in the vicinity which would cause collision.

In Action 804, the first network node 206 transmits a first uplink synchronization signal configuration to the first wireless device 210. The first uplink synchronization signal configuration configures the first wireless device 210 to transmit the uplink synchronization single and to synchronize to the first downlink synchronization signal.

In Action 805, the first network node 206 transmits a second uplink synchronization signal configuration to the second wireless device 212. The second uplink synchronization signal configuration configures the second wireless device 212 to synchronize to the second downlink synchronization signal.

In Action 806, the first network node 206 activates a beam switch trigger. This may for example be the case when the first network node 206 wants to handover a plurality of wireless devices, e.g. the first and second wireless devices 210, 212, to another network node in order to reduce the load in the first network node 206.

In Action 807, the first and second network nodes 206, 208 select one or more candidates network nodes. This is done in order to request these candidate network nodes to measure on the uplink transmission from the wireless devices, e.g. from the first wireless device 210. This subselection of neighbouring network nodes helps to reduce the measurement overhead on the communications network 200.

In Action 808, the first network node 206 transmits to the second network node 208 an indication to listen for an USS transmission. The indication may comprise a request to perform a measurement on a received USS transmission and possible also to transmit information relating to the measurement result to the first network node 206.

In Action 809, the second network node 208 transmits an acknowledgement to the first network node 206, thereby acknowledging receipt of the indication.

In Action 810, the first network node 206 activates the first wireless device 210 to transmit an USS transmission and to listen to MRS.

In Action 811, the first network node 206 activates the second wireless device 212 to listen to MRS.

In Action 812, the first wireless device 210 transmits an USS transmission to the first network node 206, and in Action 813, the first wireless device 210 transmits an USS transmission to the second network node 208.

In Action 814, the first and second network nodes 206, 208 performs a measurement on the respective received USS transmission.

In Action 815, the first network node 206 takes a beam switch decision, e.g. a handover decision, and in Action 816, the first network node 208 transmits, to the second network node 208, a beam switch request, e.g. a handover request. As previously, mentioned, the first network node 206 may request the second network node 208 to perform a handover of the first and second wireless devices 210, 212 from the first network node 206 to the second network node 208.

In Actions 817 and 818, the second network node 208 transmits a respective downlink synchronization signal, e.g. MRS1 and MRS2, to the respective one of the first wireless device 210 and the second wireless device 212.

In Actions 819 and 820, the second network node 208 transmits a respective uplink grant to the respective one of the first wireless device 210 and the second wireless device 212, and in Actions 821 and 822 user data is transmitted between the second network node 208 and the respective one of the first and second wireless devices 210, 212.

In Actions 823 and 824, the second network node 208 transmits a respective RRC configuration to the respective one of the first and second wireless devices 210, 212.

As described above, in FIG. 8 it is mentioned that the first wireless device 210 will be configured with a first uplink synchronization signal configuration '1st USS config' and the second wireless device 212 will be configured with a second uplink synchronization signal configuration '2nd USS config'. It is to be noted that these are just two different measurement configurations wherein the first uplink synchronization signal configuration '1 st USS config' will request the first wireless device 210 to perform sounding using a specified resource, e.g. a preamble or any other sequence of sounding, and to monitor for the feedback in terms of a new DL sync source illustrated as MRS1 in the FIG. 8. Similarly, the second uplink synchronization signal configuration '2nd USS config' refers to a configuration wherein the second wireless device 212 is requested to just monitor for new a DL sync source illustrated as MRS1 in the FIG. 8 without performing any USS transmission. Thus, the second wireless device 212 refrains from transmitting an USS transmission.

In some embodiments, both the first and the second wireless devices 210, 212 in FIG. 8 are configured to listen to the same synchronization source identifier i.e., both the first and the second wireless devices 210, 212 are configured, via the first uplink synchronization signal configuration and second uplink synchronization signal configuration 1st and 2nd USS config respectively, to listen to MRS1.

It should be noted that the procedure comes with an implicit robustness test. If the second wireless device 212 is not able to hear the MRS transmission from the second network node 208 in FIG. 8 in the configured slot/s, then the second wireless device 212 may by default go back to its original serving node, e.g. the first network node 206. By doing so, the first network node 206 recognizes that the second wireless device 212 was wrongly configured with the second uplink synchronization signal configuration '2nd USS config', e.g. to listen to MRS only without USS transmission, and thereby could reconfigure the second wireless device 212 with the first uplink synchronization signal configuration '1st USS config'.

The mentioned procedure comes very handy in multi handover scenarios of vehicular wireless devices moving from one AN to the another AN or in the scenarios where the source AN wants to offload more than one wireless device at a time to one or more target ANs, e.g. one or more neighbor ANs, in order to decrease the load.

When using the word "comprise" or "comprising" it shall be interpreted as non-limiting, i.e. meaning "consist at least of". Further, the word "a" or "an" should be understood to refer to "at least one" or to "one or more" if not explicitly stated that it refers to a "single" entity.

Modifications and other variants of the described embodiment(s) will come to mind to one skilled in the art having the benefit of teachings presented in the foregoing descriptions and the associated drawings. Therefore, it is to be understood that the embodiment(s) herein is/are not be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method performed by a first network node for enabling handover of a first wireless device and a second wireless device from the first network node to a second network node, wherein the first network node, the first wireless device, the second wireless device and the second network node operate in a wireless communications network, and wherein the method comprises:
   determining that the second wireless device is to refrain from transmitting an uplink synchronization signal;
   based on the determination, configuring the first wireless device to transmit an uplink synchronization signal and to synchronize to a first downlink synchronization signal, and configuring the second wireless device to synchronize to a second downlink synchronization signal;
   receiving, from the second network node, information relating to a measurement performed on the uplink synchronization signal transmitted only from the first wireless device; and
   based on the received information, requesting the second network node to perform the handover of the first and second wireless devices.

2. The method of claim 1, wherein the configuring of the first wireless device to transmit the uplink synchronization signal and to synchronize to the first downlink synchronization signal comprises:
   transmitting, to the first wireless device, a first set of configuration parameters that configures the first wireless device to transmit the uplink synchronization signal and to synchronize to the first downlink synchronization signal.

3. The method of claim 1, wherein the configuring of the second wireless device to synchronize to the second downlink synchronization signal comprises:
   transmitting, to the second wireless device, a second set of configuration parameters that configures the second wireless device to synchronize to the second downlink synchronization signal.

4. The method of claim 1, further comprising:
   transmitting, to the second network node, a request to measure the uplink synchronization signal transmitted from the first wireless device.

5. The method of claim 1, further comprising:
   based on the received information, determining that the first wireless device and the second wireless device are to be handed over from the first network node to the second network node; and wherein the requesting of the second network node to perform the handover comprises:
      transmitting, to the second network node, a handover request requesting the second network node to perform the handover.

6. The method of claim 5, wherein the handover request comprises information relating to at least one of the first downlink synchronization signal and the second downlink synchronization signal, and wherein the handover request requests the second network node to transmit at least one of the first downlink synchronization signal and the second downlink synchronization signal.

7. The method of claim 5, wherein determining that the first wireless device and the second wireless device are to be handed over comprises:
   determining that the first wireless device and the second wireless device are to be handed over responsive to the received information comprising information relating to a first signal quality measured at the second network node and responsive to at least one of:
      the first signal quality being above a signal quality threshold;
      the first signal quality being better than a second signal quality measured at the first network node; and
      the first signal quality being an amount of signal quality units better than the second signal quality measured at the first network node.

8. The method of claim 1, wherein the first and second wireless devices are identified with a respective identifier, and wherein the respective identifier is one or more of: a DeModulation Reference Signal Identity (DMRS ID), a scrambling ID; and a security key.

9. The method of claim 1, wherein the first and second downlink synchronization signals are the same downlink synchronization signal to be transmitted from the second network node and received by the respective first and second wireless devices.

10. The method of claim 1, further comprising:
   determining that the first wireless device and the second wireless device have the same or similar mobility properties.

11. A method performed by a second network node for performing a handover of a first wireless device and a second wireless device from a first network node to the second network node, wherein the first network node, the first wireless device, the second wireless device and the second network node operate in a wireless communications network, and wherein the method comprises:
   transmitting, to the first network node, information relating to a measurement performed on an uplink synchronization signal transmitted only from the first wireless device; and
   based on a handover request received from the first network node, performing a handover, from the first network node to the second network node, of the first wireless device and the second wireless device, the second wireless device refraining from transmitting an uplink synchronization signal.

12. The method of claim 11, further comprising:
   receiving, from the first network node, a request to measure the uplink synchronization signal transmitted from the first wireless device.

13. The method of claim 11, wherein the handover request comprises information relating to at least one of a first downlink synchronization signal and a second downlink synchronization signal.

14. The method of claim 13, wherein the first and second downlink synchronization signals are identical synchronization signals to be transmitted in the same time-frequency resources.

15. The method of claim 13, wherein the performing of the handover of the first and second wireless devices from the first network node to the second network node comprises:
   transmitting the respective first and second downlink synchronization signals to the respective first and second wireless devices; and
   transmitting, to the respective first and second wireless devices, a respective uplink grant signal.

16. The method of claim 11, wherein the first and second wireless devices are identified with a respective identifier, wherein the respective identifier is one or more of: a DeModulation Reference Signal Identity (DMRS ID), a scrambling ID; and a security key.

17. A first network node configured to enable handover of a first wireless device and a second wireless device from the first network node to a second network node, wherein the first network node, the first wireless device, the second wireless device and the second network node are configured to operate in a wireless communications network, and wherein the first network node comprises:
- communication circuitry configured for directly or indirectly communicating with the second network node and the first and second wireless devices; and
- processing circuitry operatively associated with the communication circuitry and configured to:
  - determine that the second wireless device is to refrain from transmitting an uplink synchronization signal;
  - based on the determination, configure the first wireless device to transmit an uplink synchronization signal and to synchronize to a first downlink synchronization signal, and configure the second wireless device to synchronize to a second downlink synchronization signal;
  - receive, from the second network node, information relating to a measurement performed on the uplink synchronization signal transmitted only from the first wireless device; and
  - based on the received information, request the second network node to perform the handover of the first and second wireless devices.

18. The first network node of claim 17, wherein the processing circuitry is configured to configure the first wireless device to transmit the uplink synchronization signal and to synchronize to the first downlink synchronization signal by being configured to:
- transmit, to the first wireless device, a first set of configuration parameters that configures the first wireless device to transmit the uplink synchronization signal and to synchronize to the first downlink synchronization signal.

19. The first network node of claim 17, wherein the processing circuitry is configured to configure the second wireless device to synchronize to the second downlink synchronization signal by being configured to:
- transmit, to the second wireless device, a second set of configuration parameters that configures the second wireless device to synchronize to the second downlink synchronization signal.

20. The first network node of claim 17, wherein the processing circuitry is configured to:
- transmit, to the second network node, a request to measure the uplink synchronization signal transmitted from the first wireless device.

21. The first network node of claim 17, wherein the processing circuitry is configured to:
- based on the received information, determine that the first wireless device and the second wireless device are to be handed over from the first network node to the second network node; and wherein the processing circuitry is configured to request the second network node to perform the handover by being configured to:
  - transmit, to the second network node, a handover request requesting the second network node to perform the handover.

22. The first network node of claim 21, wherein the handover request comprises information relating to at least one of the first downlink synchronization signal and the second downlink synchronization signal, and wherein the handover request requests the second network node to transmit at least one of the first downlink synchronization signal and the second downlink synchronization signal.

23. The first network node of claim 21, wherein the processing circuitry is configured to determine that the first wireless device and the second wireless device are to be handed over by being configured to:
- determine that the first wireless device and the second wireless device are to be handed over responsive to the received information comprising information relating to a first signal quality measured at the second network node and responsive to at least one of:
  - the first signal quality being above a signal quality threshold;
  - the first signal quality being better than a second signal quality measured at the first network node; and
  - the first signal quality being an amount of signal quality units better than the second signal quality measured at the first network node.

24. The first network node of claim 17, wherein the first and second wireless devices are identified with a respective identifier, and wherein the respective identifier is one or more of: a DeModulation Reference Signal Identity (DMRS ID), a scrambling ID; and a security key.

25. The first network node of claim 17, wherein the first and second downlink synchronization signals are the same downlink synchronization signal to be transmitted from the second network node and received by the respective first and second wireless devices.

26. The first network node of claim 17, wherein the processing circuitry is configured to:
- determine that the first wireless device and the second wireless device have the same or similar mobility properties.

27. A second network node configured to perform handover of a first wireless device and a second wireless device from a first network node to the second network node, wherein the first network node, the first wireless device, the second wireless device and the second network node are configured to operate in a wireless communications network, and wherein the second network node comprises:
- communication circuitry configured for directly or indirectly communicating with the first network node and the first and second wireless devices; and
- processing circuitry operatively associated with the communication circuitry and configured to:
  - transmit, to the first network node, information relating to a measurement performed on an uplink synchronization signal transmitted only from the first wireless device; and
  - based on a handover request received from the first network node, perform a handover, from the first network node to the second network node, of the first wireless device and the second wireless device, the second wireless device configured to refrain from transmitting an uplink synchronization signal.

28. The second network node of claim 27, wherein the processing circuitry is configured to:
- receive, from the first network node, a request to measure the uplink synchronization signal transmitted from the first wireless device.

29. The second network node of claim 27, wherein the handover request comprises information relating to at least one of a first downlink synchronization signal and a second downlink synchronization signal.

30. The second network node of claim 29, wherein the first and second downlink synchronization signals are identical synchronization signals to be transmitted in the same time-frequency resources.

31. The second network node of claim 29, wherein the processing circuitry is configured to perform the handover of the first and second wireless devices from the first network node to the second network node by being configured to:
   transmit the respective first and second downlink synchronization signals to the respective first and second wireless devices; and
   transmit, to the respective first and second wireless devices, a respective uplink grant signal.

32. The second network node of claim 27, wherein the first and second wireless devices are identified with a respective identifier, wherein the respective identifier is one or more of: a DeModulation Reference Signal Identity (DMRS ID), a scrambling ID; and a security key.

33. A non-transitory computer readable storage medium storing a computer program for enabling handover of a first wireless device and a second wireless device from a first network node to a second network node, wherein the first network node, the first wireless device, the second wireless device and the second network node are configured to operate in a wireless communications network, the computer program comprising instructions that, when executed on at least one processor of the first network node, cause the first network node to:
   determine that the second wireless device is to refrain from transmitting an uplink synchronization signal;
   based on the determination, configure the first wireless device to transmit an uplink synchronization signal and to synchronize to a first downlink synchronization signal, and configure the second wireless device to synchronize to a second downlink synchronization signal;
   receive, from the second network node, information relating to a measurement performed on the uplink synchronization signal transmitted only from the first wireless device; and
   based on the received information, request the second network node to perform the handover of the first and second wireless devices.

34. A non-transitory computer readable storage medium storing a computer program for performing handover of a first wireless device and a second wireless device from a first network node to a second network node, wherein the first network node, the first wireless device, the second wireless device and the second network node are configured to operate in a wireless communications network, the computer program comprising instructions that, when executed on at least one processor of the second network node, cause the second network node to:
   transmit, to the first network node, information relating to a measurement performed on an uplink synchronization signal transmitted only from the first wireless device; and
   based on a handover request received from the first network node, perform a handover, from the first network node to the second network node, of the first wireless device and the second wireless device, the second wireless device configured to refrain from transmitting an uplink synchronization signal.

* * * * *